United States Patent [19]

Black

[11] 4,396,101

[45] Aug. 2, 1983

[54] INTERLEAVED FRICTION PLATE CLUTCH HAVING MEANS TO PREVENT PLATE WOBBLE

[75] Inventor: James B. Black, Roscoe, Ill.

[73] Assignee: Twin Disc, Incorporated, Racine, Wis.

[21] Appl. No.: 229,098

[22] Filed: Jan. 28, 1981

[51] Int. Cl.³ .................... F16D 25/063; F16D 13/69
[52] U.S. Cl. .............................. 192/85 AA; 192/70.2;
192/70.28; 192/86
[58] Field of Search ............. 192/70.2, 70.28, 85 AA,
192/86; 188/72.3, 216

[56] References Cited

U.S. PATENT DOCUMENTS 2,326,960  8/1943  McCune ........................ 188/72.3 X
2,349,132  5/1944  Baird ............................ 192/70.28 X

FOREIGN PATENT DOCUMENTS 1069725  2/1954  France .......................... 192/70.28
529822  11/1940  United Kingdom .......... 192/85 AA Primary Examiner—Allan D. Herrmann
Attorney, Agent, or Firm—James E. Nilles

[57] ABSTRACT

A multiple, interleaved friction plate clutch has a clutch pack including a plurality of externally toothed clutch plates and a plurality of internally toothed clutch plates which are interleaved with said externally toothed clutch plates. Hydraulically actuated means are provided for clamping said interleaved plates together to provide a releasable driving connection, whereby said plates may be shifted between a clutch clamp-up position and a clutch released position in which said plates are separated from one another and have relative rotation therebetween. A plurality of axially extending rods are circumferentially spaced around and located adjacent the outer periphery of the externally toothed clutch plates, and a plurality of axially extending rods are circumferentially spaced around and located adjacent the inner periphery of the internally toothed clutch plates. Sets of rods have a connection with their respective clutch plate, so that when the clutch is released, the rods hold their respective plates normal to the axis of rotation of the clutch and prevent the plates from wobbling.

1 Claim, 8 Drawing Figures

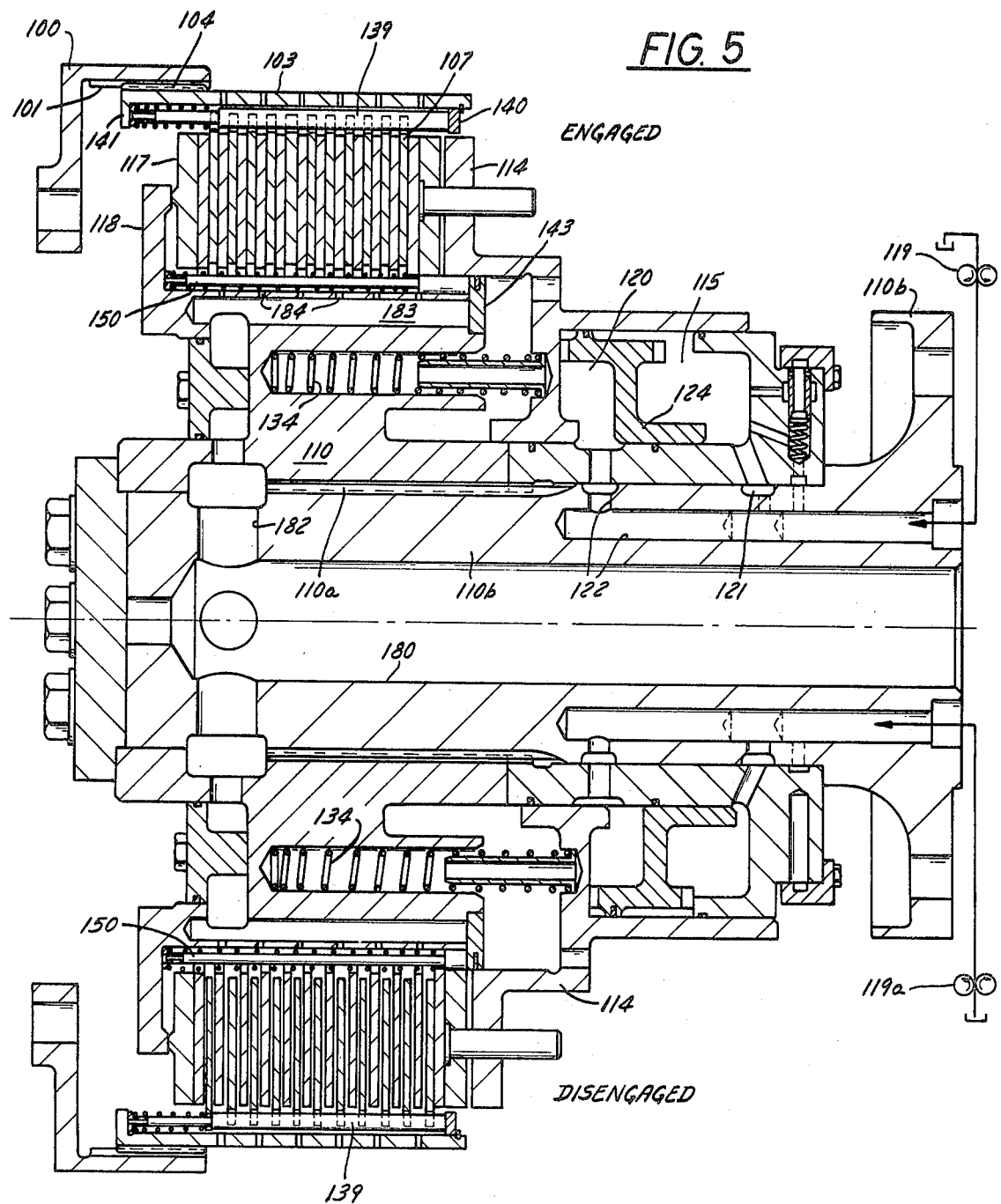

INTERLEAVED FRICTION PLATE CLUTCH HAVING MEANS TO PREVENT PLATE WOBBLE

BACKGROUND OF THE INVENTION

Friction plate clutches have a provision for passing fluid such as oil between the clutch plates so as to lubricate or cool the plates. Furthermore other multi-plate clutches have attempted to prevent plate flutter and have been successful to some extent. Such devices are shown in U.S. Pat. No. 4,068,747 which issued Jan. 17, 1978 to Snoy and entitled "Multi-Plate Clutch Having Means to Prevent Clutch Flutter", wherein the outer periphery of the plates were formed as flat portions or spots which act as cams when the adjacent discs rotate relative thereto and thereby resist the tendency to flutter. U.S. Pat. No. 3,631,953 also issued to Snoy on Jan. 4, 1972 entitled "Friction Plate Clutch Having Means To Dampen Plate Flutter" utilized resilient means between the radially inner set of clutch plates and which purposely caused the plates to go into a mode of flutter so that the flutter could then be damped by split type outer clutch plates.

Yet another example of a prior art attempt to eliminate clutch flutter is shown in the Hilpert U.S. Pat. No. 3,472,348 issued Oct. 14, 1969 entitled "Clutch Having Radially Shiftable Means to Prevent Flutter", and wherein grooved weights were shifted radially outwardly so as to engage the inner periphery of the inner set of plates to thereby mechanically hold the plates in properly spaced relationship and resiliently prevent axial movement or flutter of the plates. These three above mentioned patents have been assigned to an assignee common with the present invention and while they did prove successful for their intended purposes in certain clutch uses, with the advent of very large clutches, the flutter problem continues to persist and has prohibited the use of friction plate clutches in extremely large installations, such as for example that are found in marine vessels.

Other types of multiple and interleaved friction plate clutches have attempted to control the coolant flow between the plates of a clutch, for the purpose of urging the clutch applying means to a clutch releasing direction or for maximizing the supply of cooling fluid to the plates upon engagement. However, the problem of clutch flutter does not occur when the clutch is engaged, but rather occurs when the clutch is in the release condition when the plates are separated from one another and the two sets of plates are counter-rotating.

SUMMARY OF THE PRESENT INVENTION

The present invention provides a multiple, interleaved, friction plate clutch wherein axially extending rods have a connection with their respective clutch plates whereby the rods positively hold the plates spaced from one another to prevent clutch plate flutter when the clutch is disengaged and the plates have relative rotation therebetween. When the clutch is disengaged, means are provided for positively shifting the plates to a predetermined fixed position, to thereby prevent plate flutter.

A more specific aspect of the invention relates to the means for pushing the plates to the fixed position where they cannot wobble. One means may be hydraulically actuated pistons while an alternative means utilizes springs that bear against their respective plate. The released plates are thus positively held normal to the axis of rotation to prevent their wobble or flutter.

These and other objects and advantages of the present invention will appear hereinafter as this disclosure progresses, reference being had to the accompanying drawings.

BRIEF DESCRIPTION OF THE DRAWINGS

FIGS. 5 to 8 show a modified form of the invention utilizing springs for returning the plates to the stable, released position;

FIG. 5 is a longitudinal cross-sectional view through a clutch embodying the present invention, the upper portion of the view showing the clutch in the engaged position while the lower portion of the view shows the clutch in the disengaged position;

FIG. 6 is an enlarged, fragmentary cross-sectional view showing a portion of the FIG. 5 device, when the clutch is in the released position;

FIG. 7 is a transverse sectional view taken generally along the line 7—7 in FIG. 6;

FIG. 8 is a plan or flat view of the clutch shown in FIG. 6 and taken generally along the line 8—8 and showing three adjacent rods with their return springs and their respective clutch plates.

DESCRIPTION OF A PREFERRED EMBODIMENT

Figure 1:
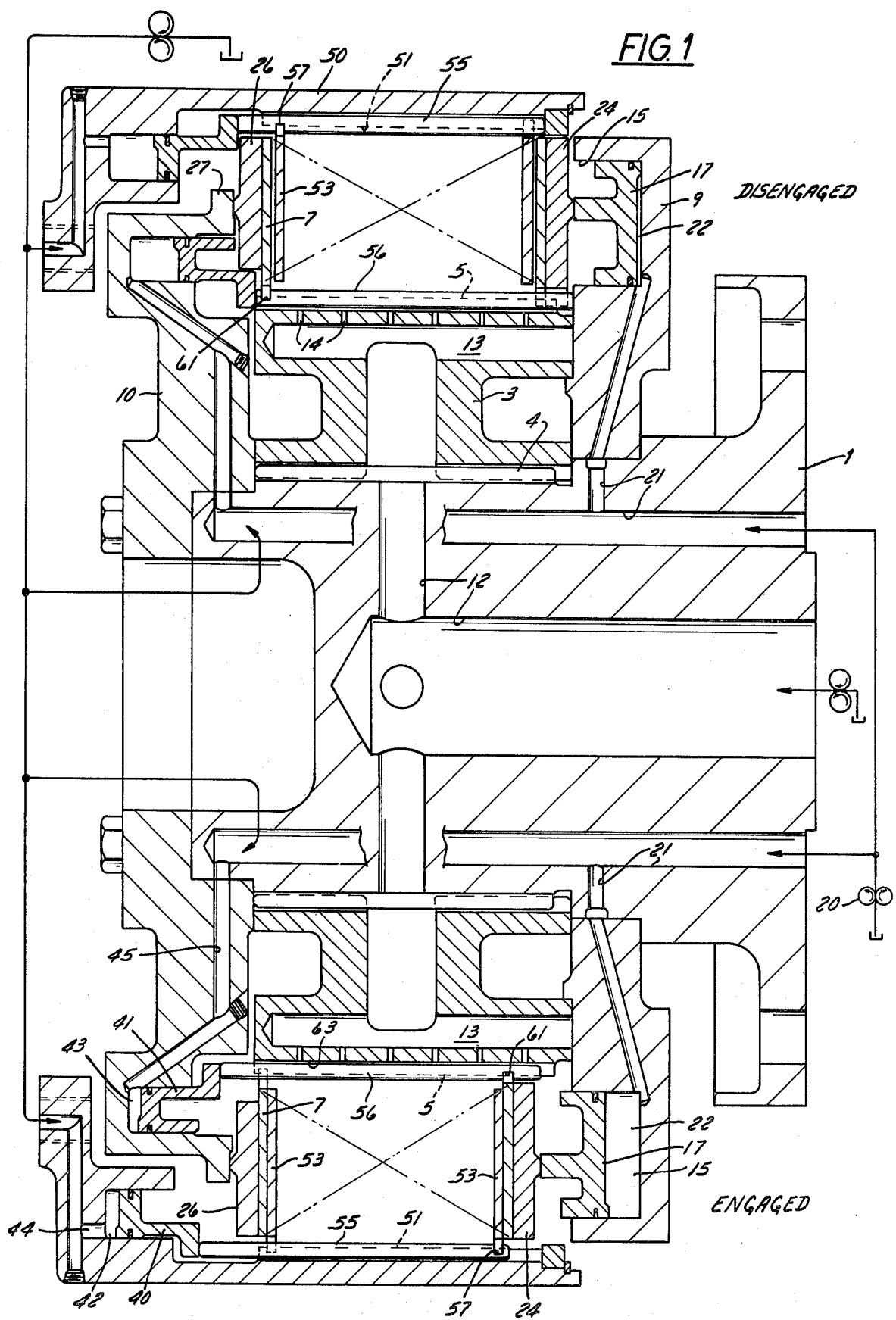
FIG. 1 is a longitudinal, cross-sectional view through an interleaved, multiple plate friction clutch embodying the present invention, the top portion of the view showing the clutch in the disengaged position while the bottom portion of the view shows the clutch in the engaged position.

FIGS. 1 to 4 show one embodiment of the invention wherein positive plate separation is accomplished by means of axially floating rods that have hydraulically actuated means, such as hydraulically actuated pistons that act on one end of the rods to urge them and the plates connected therewith to the clutch released position. In the clutch released position, the plates are positively held normal to the axis of rotation and are prevented from fluttering. More specifically, the clutch arrangement shown in FIG. 1 for the purpose of illustrating the invention includes a power input shaft 1 on which a clutch hub 3 is splined at 4, and which hub has a series of axially extending teeth or splines 5 on which are axially slideable a first set of internally toothed or splined friction clutch plates 7. The arrangement also includes a clutch housing member 9 at one end and another clutch housing member 10 at the other end, both of which are rigidly fastened to the shaft member 1 for rotation therewith. The drive shaft includes passage means 12 through which lubricating fluid is introduced into the manifold section 13 and passes through a series of small holes 14 and for the purpose of lubrication of the plates in the known manner.

The clutch housing 9 has an annular chamber 15 formed therein in which the clutch actuating piston 17 is slideable in the known manner. High pressure apply fluid is introduced from a source such as a pump 20 and via passage means 21 to the clutch actuating chamber 22 located behind the piston. Pressurization of chamber 22 in the known manner causes the piston to urge the plate clamp-up member 24 against the clutch pack and this reaction is absorbed by the back-up plate 26 at the other end of the pack which bears against the housing portion 27.

At the other side of the clutch pack is located a pair of clutch releasing annular ring pistons 40 and 41 slideably mounted, respectively in the annular chambers 42 and 43 formed in the clutch housing 10. Fluid passages 44 and 45, respectively, provide fluid pressure to pressurize the chambers 42 and 43, respectively, when the clutch has been released, that is to say when the high pressure fluid in the opposite clutch chamber 22 has been terminated. Chambers 42 and 43 may be continuously pressurized with lubricating fluid at a lower pressure than chamber 22. Pistons 40 and 41, when the clutch is released, shift the clutch plates to a predetermined spaced apart position in which they are normal to the axis of rotation and are held in that position to prevent flutter.

Figure 2:
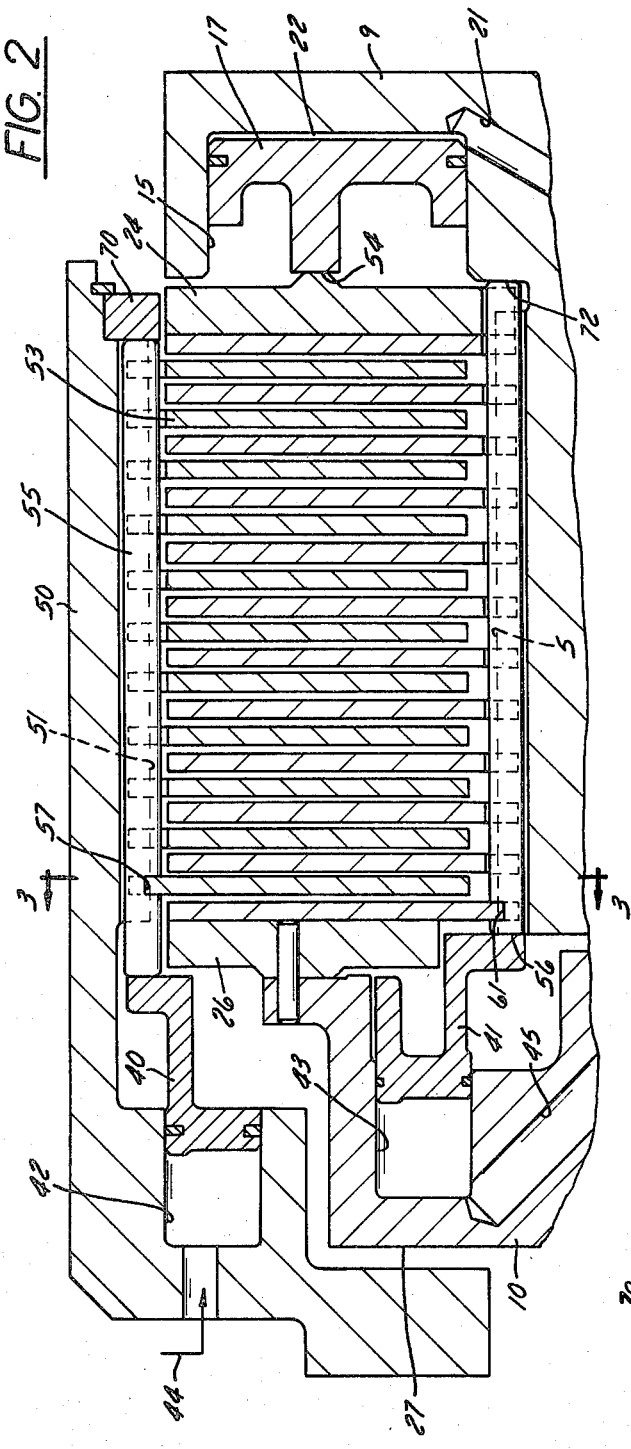
FIG. 2 is an enlarged view of a portion of the FIG. 1 illustration.

The output member takes the form of a drum or spider 50 having a set of internal splines 51 on which are axially slideably mounted a second set of clutch plates 53. The set of clutch plates 7 and the set 53 are interleaved in the known manner and are shown in FIG. 2 in the clutch released position where the clutch apply member 24 is abutted at 54 against the retracted piston 17 and the clutch release pistons 40 and 41 at the opposite side of the clutch pack are engaged or shifted to the right, due to pressurization of the respective chambers 42 and 43, to positively hold both sets of clutch plates in the normal position relative to the axis of rotation as follows.

A plurality of axially extending rods are shiftably mounted in an axial direction around the clutch plates, one set of rods 55 are connected with the outer periphery of the externally toothed plates of the set 53 and these rods are shifted to the released position by the piston 40 which abuts against the rod ends. The internally splined or toothed plates in the plate set 7 also have a plurality of axially extending rods 56 connected therewith at their internal periphery and these rods are urged to the clutch released, anti-wobble position by the annular piston 41 abuttable against the rod ends.

Figure 3:
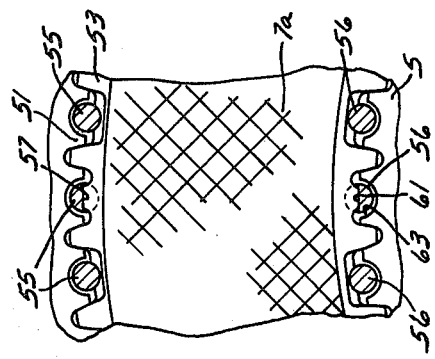
FIG. 3 is a transverse, cross-sectional view taken along line 3—3 in FIG. 2.
Figure 4:
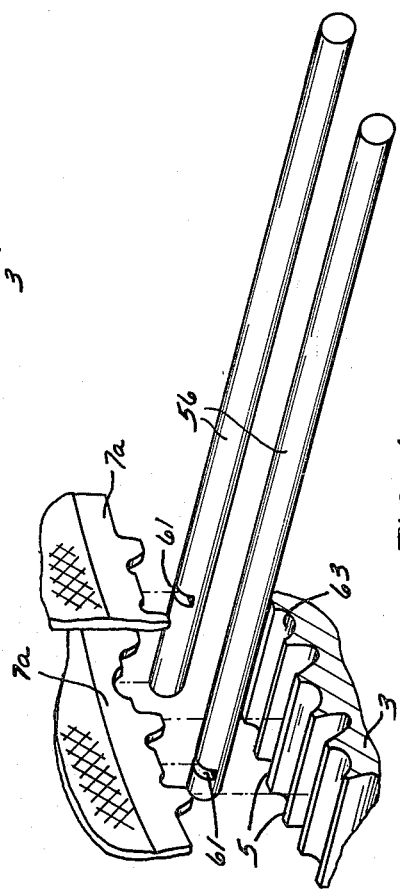
FIG. 4 is a fragmentary, perspective view of two adjacent rods and showing their key or slot connection with their respective internally toothed clutch plates.
Figure 7:
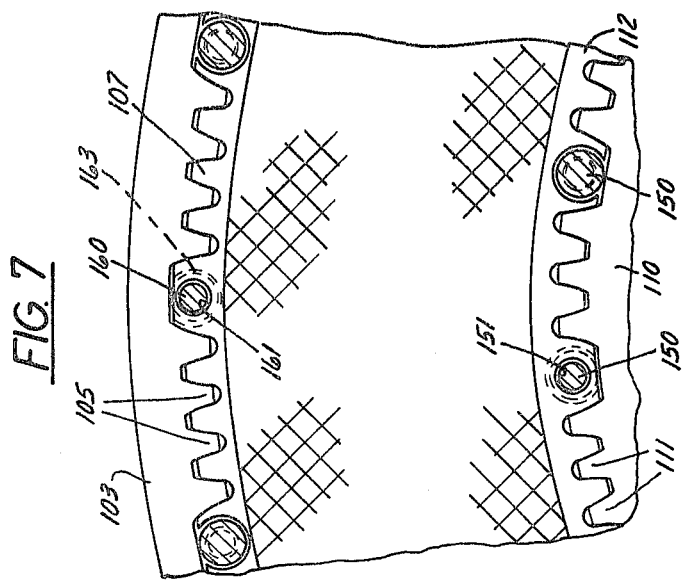
Figure 6:
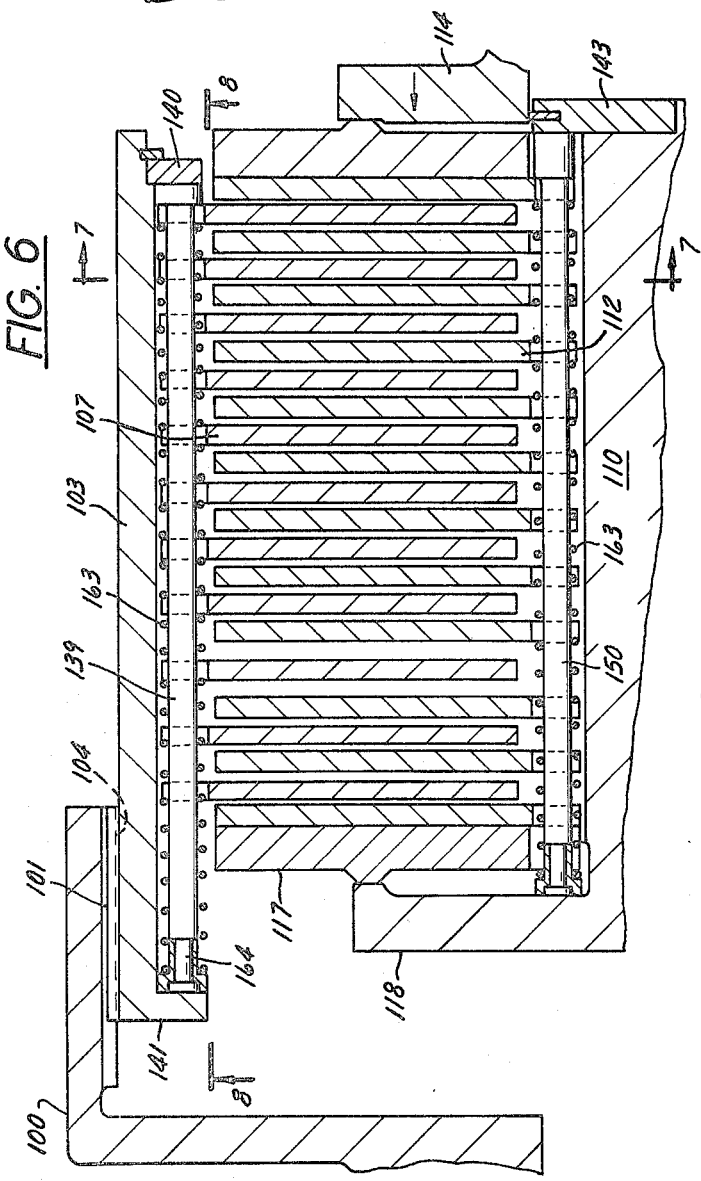

More specifically, each of the plates of the exteriorily toothed plate set have, for example, three rods 55 circumferentially spaced around their periphery. Similarly, the internally toothed plates each have, for example, three rods 56 circumferentially spaced therearound. As shown in FIGS. 2 and 3, each plate 53 is connected to each of its respective three rods by means of a transverse slot 57 extending transversely and partially through the rod, and in which slot the edge of the clutch plate is firmly inserted. Specifically, as shown in FIG. 4, a rod 56 has a slot 61 in which the clutch plate 7a is seated. The rod 56 in turn is adapted to seat in an arcuate groove 63 formed in the hub 3 and located between adjacent splines 5 of the hub. It will thus be seen that three rods are provided for each plate and axial movement of the rods carries their respective plate with them. When in the position shown in the upper portion of FIG. 1, and also shown in FIG. 2, the apply pressure in chamber 22 has been released, the opposite chambers 42 and 43 have been pressurized, and their respective pistons 40 and 41 shifted to the right, where piston 40 abuts against the left hand end of the outer rods 55 and piston 41 abuts against the left hand ends of the inner rods 56, urging the rods 55 and 56 against their respective stops, such as a fixed stop ring 70 and the shoulder 72 of the housing 9. The rods have carried with them their respective plates which are then positively held in a predetermined spaced apart relationship with one another and are prevented from wobbling or fluttering.

FIGS. 5 to 8 illustrate another modification of the invention. This modification includes a driving spider 100 driven from a power source, not shown, and having an internally splined portion 101. A cylindrical, axially floating member 103 has a spline connection 104 with the spline 101 of the spider. The floating member 103 has internal splines 105 (see FIG. 7) with a series of externally toothed clutch plates 107 axially slideable thereon.

The clutch also includes a hub 110 splined at 110a to an output shaft 110b having a series of external splines 111 (FIG. 7) on which are connected internally toothed clutch plates 112 in the known manner. Plates 107 and 112 are interleaved and are clamped together by the piston 114 when the actuating chamber 115 is pressurized so as to force the clutch plates to the left end against the back plate 117 and the back plate 118 of the hub, also in the known manner.

The particular type clutch actuating chamber shown is of the redundant or dual type having another clutch actuating chamber 120. Fluid pressure from a source 119 is introduced into chamber 115 via passage 121 while fluid pressure is also introduced from a source 119a into chamber 120 via passage 122. An annular piston member 124 is axially slideably mounted within and between the chambers 115 and 120 and this arrangement provides a fail-safe feature in the event one or the other pressure sources is inoperative. Such a redundant clutch feature is shown in the U.S. Pat. No. 3,833,183 issued Sept. 3, 1974, and reference may be had to that general type of dual actuating chamber clutch if further details are deemed necessary or desirable.

A series of springs 134 urge the piston 114 to the clutch released position when the clutch apply pressure has terminated.

In this modification of the invention, each of the clutch plates is also provided with three circumferentially spaced rods, all of the outer rods 139 being axially fixed between a stop ring 140 located in the floating member and the radial flange 141 at the other end of the floating member 103. The inner rods 150 are also axially fixed between stop 143 on the hub and the hub back plate 118.

The inner rods 150 extend through holes 151 (FIG. 7) located adjacent the internal periphery portion of the internally toothed plates 112. The outer rods 139 similarly extend through corresponding holes 161 located adjacent the radially outer portion or periphery of the externally toothed clutch plates 107.

It will be noted that the rods include a reduced portion that defines a shoulder 162 on the rods. A spring 163 is mounted on the reduced portion of the rods and abuts against its respective plate, urging the latter against its rod's shoulder. The other end of the spring has a split keeper 164 for the purposes of assembling the springs and their respective rods and holding them in assembled relationship.

Figure 8:
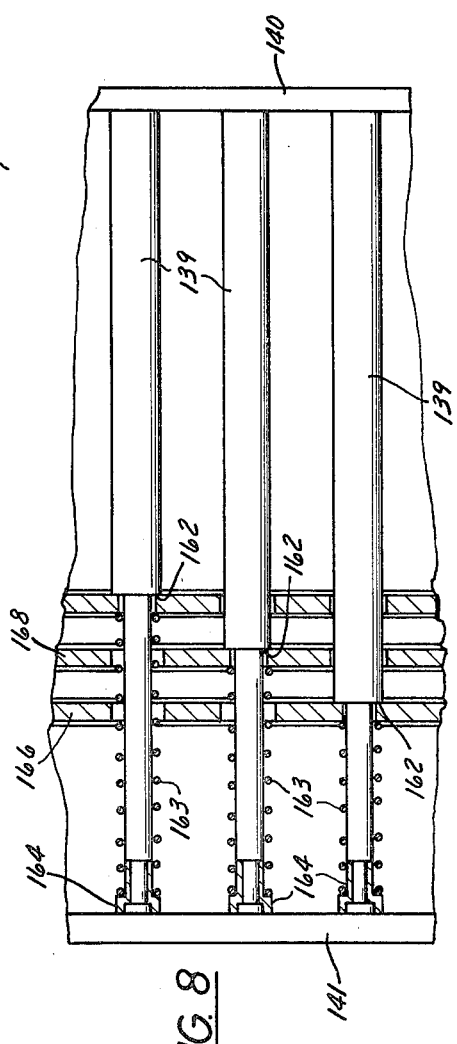

Referring again to FIG. 8, it will be noted that the overall length of all of the rods is the same, but the location of the shoulder 162 on each of the three sets of rods per plate is different than the other rods. For example, as shown in FIG. 8, the clutch plate 166 bears against the shoulder 162 of the three rods (only one shown), while the next plate 168 would bear against the shoulder 162 of the three adjacent rods (only one shown). In each combination of plate and rods, its respective spring urges the plate against the shoulders of its three rods when the clutch is released to thereby hold the plates firmly in a normal position to the axis of rotation of the clutch.

Conventional lubrication and cooling fluid passages 180, 181, 182, 183 and 184 are also provided for the clutch plates in the FIG. 5 embodiment.

RECAPITULATION

In either form of the invention, there are provided a plurality of rods, for example, three circumferentially spaced rods for each clutch plate. In the FIG. 1 embodiment, the plates are axially fixed to their respective set of rods by being engaged in the notches of their rods and the rods are axially shiftable together with their plates by the hydraulic cylinders to the clutch released, anti-wobble position. In the FIG. 5 embodiment, the plates are urged by the springs against the shoulder of their respective set of three rods to again hold them in the normal or "square" position relative to the rotational axis of the clutch.

In either modification of the invention, the plates may be shifted between a clutch clamp-up position and a clutch released position in which said plates are separated from one another and have relative rotation therebetween. A plurality of axially extending rods are circumferentially spaced around and located adjacent the outer periphery of said externally toothed clutch plates, and a plurality of axially extending rods are circumferentially spaced around and located adjacent the inner periphery of said internally toothed clutch plates. Sets of rods have a connection with their respective clutch plate, whereby when said clutch is released, said rods hold their respective plates normal to the axis of rotation of said clutch and prevent said plates from wobbling.

What I claim is:

1. A multiple, interleaved friction plate clutch comprising, a driving member, a driven member and a clutch pack between said driving and driven members, said pack comprising a plurality of externally toothed clutch plates having an axially slideable connection relative to one of said members for driving engagement therewith, said pack also including a plurality of internally toothed clutch plates which are interleaved with said externally toothed clutch plates and which have an axially slideable connection relative to the other of said members, hydraulically actuated means for clamping said interleaved plates together to provide a releasable driving connection between said members, whereby said plates may be shifted between a clutch clamp-up position and a clutch released position in which said plates are separated from one another and have relative rotation therebetween, a plurality of axially extending rods circumferentially spaced around and located adjacent the outer periphery of said externally toothed clutch plates, a plurality of axially extending rods circumferentially spaced around and located adjacent the inner periphery of said internally toothed clutch plates, sets of a plurality of said rods, each set having a connection with its respective clutch plate, whereby when said clutch is released, said rods hold their respective plates normal to the axis of rotation of said clutch and prevent said plates from wobbling, said connection between said rods and their respective plates comprising a slot in said rods and in which its plate is mounted so as to prevent relative axial movement therebetween, a hydraulically actuated annular ring piston engageable with one end of all of said rods of said externally toothed plates, a second hydraulically actuated annular ring piston engageable with one end of all of said rods of said internally toothed plates, said ring pistons acting to slide all of their respective rods in an axial direction to a clutch released position whereby said plates are axially carried by their respective rods to a clutch released position and for holding said plates normal to the clutch axis to prevent wobble thereof.

\* \* \* \* \*